United States Patent
Diab et al.

(10) Patent No.: US 8,234,510 B2
(45) Date of Patent: Jul. 31, 2012

(54) SYSTEM AND METHOD FOR ENERGY SAVINGS THROUGH EMULATION OF WAKE ON LAN IN ENERGY EFFICIENT ETHERNET

(75) Inventors: Wael William Diab, San Francisco, CA (US); Steven Lindsay, Bend, OR (US)

(73) Assignee: Broadcom Corporation, Irvine, CA (US)

( * ) Notice: Subject to any disclaimer, the term of this patent is extended or adjusted under 35 U.S.C. 154(b) by 518 days.

(21) Appl. No.: 12/485,333

(22) Filed: Jun. 16, 2009

(65) Prior Publication Data
US 2010/0218011 A1    Aug. 26, 2010

Related U.S. Application Data

(60) Provisional application No. 61/155,544, filed on Feb. 26, 2009.

(51) Int. Cl.
*G06F 1/00*    (2006.01)
*G06F 1/32*    (2006.01)

(52) U.S. Cl. .................. 713/310; 713/300; 713/320
(58) Field of Classification Search .......... 713/300, 713/310
See application file for complete search history.

(56) References Cited

U.S. PATENT DOCUMENTS

| | | | |
|---|---|---|---|
| 6,189,108 B1 * | 2/2001 | Cromer et al. | 713/340 |
| 6,795,450 B1 * | 9/2004 | Mills et al. | 370/463 |
| 7,392,412 B1 * | 6/2008 | Lo | 713/320 |
| 7,971,080 B2 * | 6/2011 | Yee | 713/320 |
| 8,046,614 B2 * | 10/2011 | Henderson et al. | 713/320 |
| 2003/0165142 A1 | 9/2003 | Mills et al. | |
| 2007/0183786 A1 * | 8/2007 | Hinosugi et al. | 398/140 |
| 2008/0162682 A1 * | 7/2008 | Ramachandran et al. | 709/223 |
| 2008/0175227 A1 | 7/2008 | Moore et al. | |
| 2009/0063878 A1 * | 3/2009 | Schmidt et al. | 713/310 |
| 2009/0133040 A1 * | 5/2009 | Stevens, IV | 719/315 |
| 2010/0174808 A1 * | 7/2010 | Dabagh et al. | 709/221 |
| 2011/0191610 A1 * | 8/2011 | Agarwal et al. | 713/310 |

FOREIGN PATENT DOCUMENTS

| | | |
|---|---|---|
| EP | 0777172 A1 | 6/1997 |
| WO | WO 02/28019 A2 | 4/2002 |

OTHER PUBLICATIONS

European Search Report, Jul. 5, 2010.

* cited by examiner

*Primary Examiner* — Nitin Patel
(74) *Attorney, Agent, or Firm* — Duane S. Kobayashi

(57) ABSTRACT

A system and method for energy savings through emulation of wake on LAN (WoL) in energy efficient Ethernet networks. An intermediary device between a computing device and a network can be alerted that the computing device has entered an energy saving state with wake on LAN (WoL) enabled. The intermediary device can transition the client interface that supports the computing device into an energy saving state and emulate the WoL function of the computing device by listening for a WoL message destined for the computing device. Upon receipt of a WoL message destined for the computing device, the intermediary device can transition the client interface back to an active state then transmit the received WoL message to the computing device.

22 Claims, 4 Drawing Sheets

SYSTEM AND METHOD FOR ENERGY SAVINGS THROUGH EMULATION OF WAKE ON LAN IN ENERGY EFFICIENT ETHERNET

This application claims priority to provisional application No. 61/155,544, filed Feb. 26, 2009, which is incorporated by reference herein, in its entirety, for all purposes.

BACKGROUND

1. Field of the Invention

The present invention relates generally to Ethernet systems and, more particularly, to a system and method for energy savings through emulation of wake on LAN in energy efficient Ethernet.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., computing devices, displays, printers, servers, network equipment, etc.).

One area in which energy savings can be realized is in the various energy states that can be defined for all or part of a system (e.g., computing device). One example of such an energy state is a sleep mode. For example, a sleep mode can be entered autonomously by a computing device. While this sleep mode produces energy savings in the computing device itself, what is needed is a mechanism for saving energy on a client interface during sleep modes.

SUMMARY

A system and/or method for energy savings through emulation of wake on LAN in energy efficient Ethernet, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Computing devices can enter into a sleep mode autonomously. When a computing device goes into a sleep mode (e.g., standby or hibernate state), the computing device itself can save considerable power by powering down the CPU(s), display, and most other peripherals. A computing device that enters into a sleep mode can have Wake on LAN (WoL) enabled. The WoL function enables the waking of the computing device remotely over a network connection. With WoL enabled, power is reserved for the network interface device, which can be designed to listen for a specific packet (i.e., "magic packet"). When the computing device validates the receipt of a magic packet, the network card turns on the computing device to a full operational state.

Figure 1:
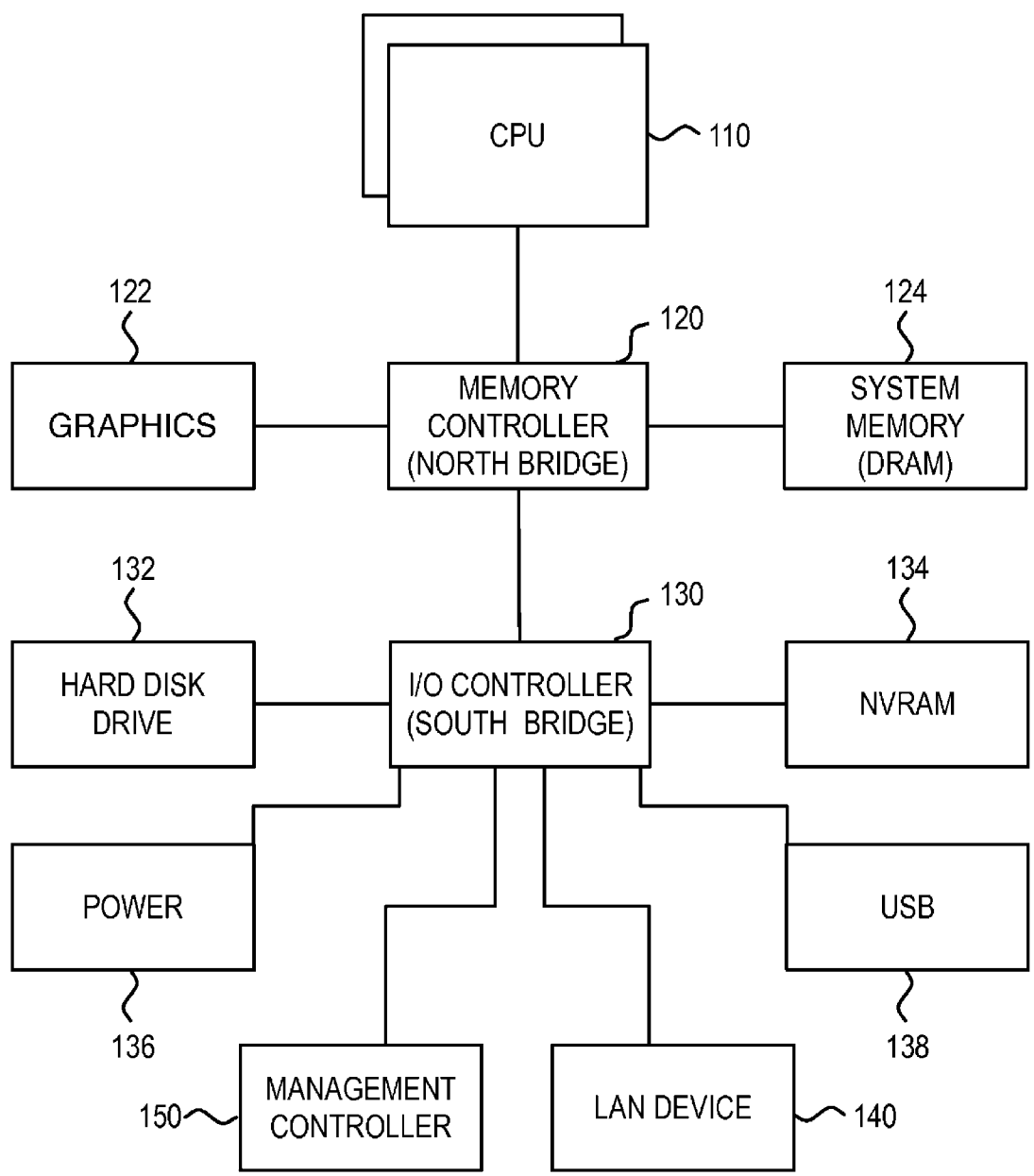
FIG. 1 illustrates an example of a network environment.

FIG. 1 illustrates an example embodiment of a computing device. As illustrated, a computing device includes conventional computing components such as CPU(s) 110, memory controller (north bridge) 120, and I/O controller (south bridge) 130. As illustrated, memory controller 120 can be coupled to graphics subsystem 122 and main system memory 124. I/O controller 130, on the other hand, can also be coupled to various components, including hard disk drive 132, non-volatile RAM (NVRAM) 134, power subsystem 136 and USB controller 138. As would be appreciated, the example embodiment of FIG. 1 is not intended to be exhaustive or limiting. Various other memory controller and I/O controller configurations can be used with the principles of the present invention.

As FIG. 1 further illustrates, I/O controller 130 is also in communication with LAN device 140. In general, LAN device 140 provides networking functionality onto the motherboard, thereby eliminating the need for an add-in network interface card (NIC). In one embodiment, LAN device 140 includes a fully integrated 10/100/1000 BASE-T Gigabit Ethernet media access controller (MAC), PCI Express bus interface, on-chip buffer memory, and integrated physical layer (PHY) transceiver in a single-chip solution. In other embodiments, the PHY may not be integrated such as when initially supporting higher-end PHYs (e.g., 10 GBASE-T). In other embodiments, LAN device 140 can also include a wireless communication component.

In one embodiment, LAN device 140 (possibly with an integrated management controller) can also be used in an OS-absent environment (with CPU(s), chipset, and system memory powered down) to run offline applications. In various embodiments, the management controller is a discrete device such as that illustrated in FIG. 1, or can be integrated with memory controller 120, I/O controller 130, LAN device 140, etc. As noted, IT administrators can communicate with LAN device 140 even when the computing device's OS is hibernating. For example, the IT administrator can perform an upgrade or other management to the computing device through a request on WoL event through LAN device 140.

Figure 2:
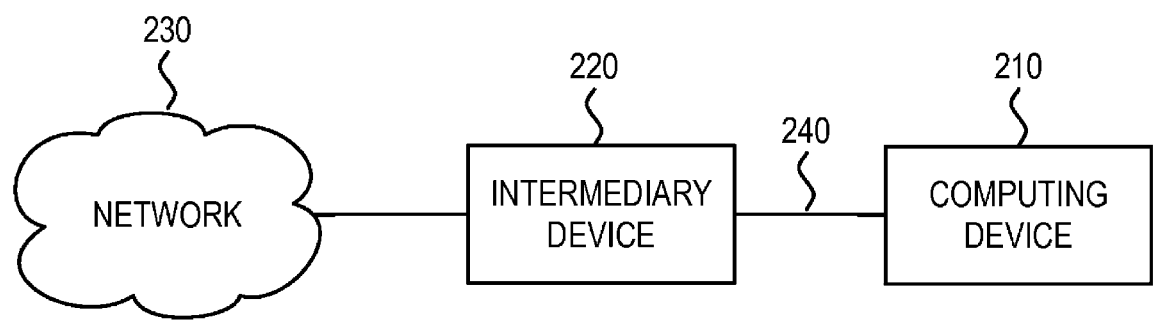
FIG. 2 illustrates an embodiment of a computing device.

FIG. 2 illustrates an example network environment in which a computing device can reside. As illustrated, computing device 210 can be coupled to intermediary device 220. Intermediary device 220 in turn is coupled to network 230 such as an intranet or wide area network. In one function, intermediary device 220 can be designed to facilitate a connection by computing device 210 to network 230. In one example, intermediary device 220 can be embodied as a voice over IP (VOIP) phone platform.

Figure 3:
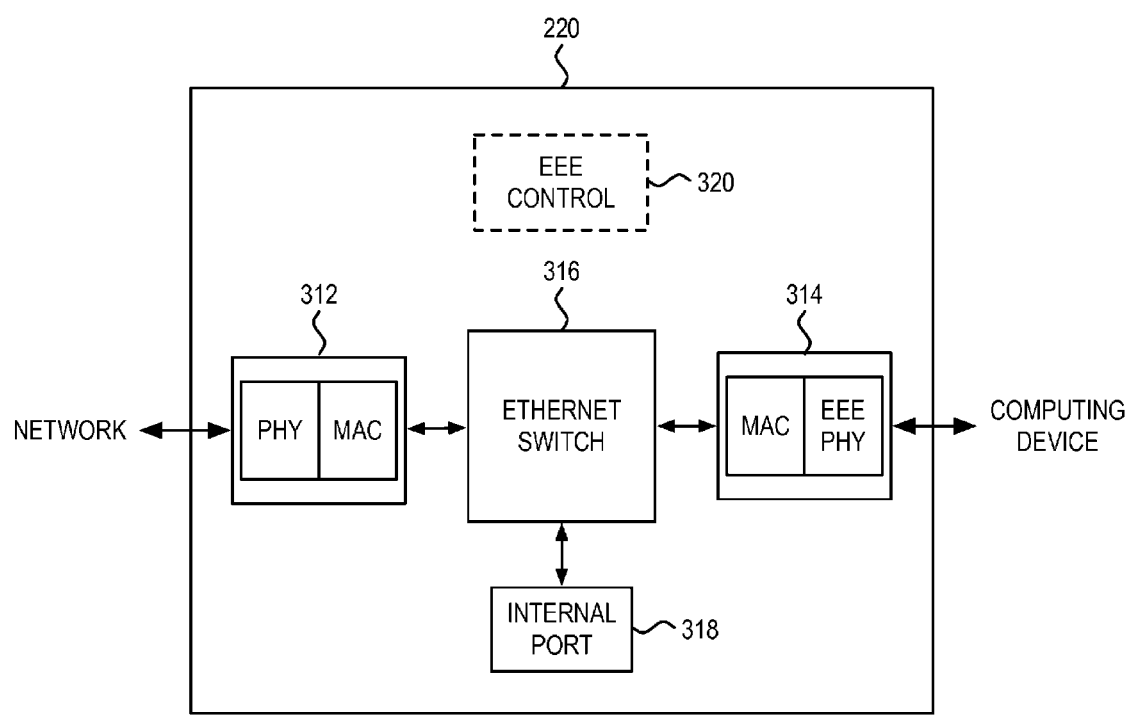
FIG. 3 illustrates an embodiment of device that enables switching.

An embodiment of intermediary device 220 is illustrated in FIG. 3. As illustrated, intermediary device 220 includes at least two Ethernet ports 312, 314 and internal port 318. Ethernet ports 312, 314 and internal port 318 support full duplex links such that traffic can be coming from either direction at the same time. Traffic can also be switched to two ports simultaneously. For example, internal port 318 can add traffic to either or both of Ethernet ports 312, 314, or receive traffic from either or both of Ethernet ports 312, 314. Ethernet ports 312, 314 and internal port 318 are coupled together via switch 316.

As would be appreciated, Ethernet ports 312, 314 can be enabled using media access control (MAC) and PHY interfaces. As illustrated in FIG. 3, Ethernet port 314 can be configured with an Energy Efficient Ethernet (EEE) PHY, the function of which will be described in greater detail below.

As FIG. 3 further illustrates, intermediary device 220 also includes EEE control 320. In general, EEE control 320 can include suitable logic, circuitry, and/or code that can be enabled to establish and/or implement an EEE control policy for intermediary device 220. EEE control 320 can be a logical and/or functional block that may, for example, be implemented in portions of the intermediary device host, the MACs, and/or the PHYs. EEE control 320 could be comprised partially by a processor that runs embedded firmware. EEE control 320 can be enabled to analyze traffic on the physical links and to analyze operations and/or processing of data. In one embodiment, EEE control 320 can exchange information with link partners. EEE control 320 can also exchange information from, or pertaining to, one or more layers of the OSI hierarchy to establish and/or implement the EEE control policy.

Ethernet port 312 enables intermediary device 220 to communicate with network 230. Ethernet port 314, on the other hand, enables intermediary device 220 to communicate with computing device 210. In combination, Ethernet ports 312, 314 and switch 316 enable intermediary device 220 to operate as an end point device (e.g., VOIP phone) or as an intermediary device in the network. Said another way, intermediary device 220 can operate as an intermediary switch between computing device 210 and network 230 or simply as an originating/terminating network device, for example, in sourcing/receiving VOIP telephony traffic.

As noted above, computing device 210 can be designed to enter a sleep mode autonomously. In this scenario, intermediary device 220 on the other end of the network link that is connected to computing device 210 would not know that computing device 210 has entered a low power state with WoL enabled. Consequently, Ethernet link 240 between computing device 210 and intermediary device 220 would remain "up" in order for WoL to work on computing device 210. As Ethernet link 240 remains "up," intermediary device 220 would not power down the PHY connected to computing device 210. Intermediary device 220 therefore loses an opportunity to achieve any significant energy savings when computing device 210 enters a sleep state with WoL enabled.

It is a feature of the present invention that intermediary device 220 can achieve significant energy savings on link 240 when computing device 210 enters into a sleep state with WoL enabled. This feature of the present invention is enabled by a protocol where computing device 210 informs intermediary device 220 when it is going into a sleep state with WoL enabled and what WoL "patterns" the network interface device of computing device 210 is configured to support. As multiple types of "WoL packets" can be defined, the protocol can be designed to communicate to intermediary device 220 the precise pattern of each potential WoL packet.

In one embodiment, the protocol on the side of computing device 210 can be implemented in a device driver that receives the wake-up patterns from the OS. On the side of intermediary device 220, the protocol could be implemented in firmware as part of EEE control 320. This would allow intermediary device 220 to act effectively as a WoL proxy for the sleeping computing device 210 and to watch for WoL packets directed to the sleeping computing device 210. Significantly, in its capacity as a proxy, intermediary device 220 could power down its PHY on Ethernet link 240 that is connected to computing device 210. The PHY could remain powered down unless intermediary device 220 receives a special WoL packet destined for the sleeping computing device 210. Intermediary device 220 would discard (not forward) any non-WoL packets addressed for computing device 210. This would allow both intermediary device 220 and computing device 210 to save additional power by allowing their PHYs to power down, and to stay powered down unless a WoL packet needs to be handled. In addition, intermediary device 220 can also be designed to achieve additional energy savings by slowing or stopping other logic associated with the client interface that supports computing device 210.

As would be appreciated, intermediary device 220 would be designed to keep the networking interface "up" on the side interfacing with network 230. For example, in the embodiment of intermediary device 220 as a VOIP phone platform the interface with network 230 would enable support for VOIP phone calls to the VOIP phone. In general, the active interface with network 230 would enable intermediary device 220 to support traffic that is destined for intermediary device 220 or to snoop for traffic that is destined for computing device 210.

In one embodiment, this snooping can be designed to match the traffic to a WoL filter. If intermediary device 220 detected a WoL packet for computing device 210, intermediary device 220 would buffer that packet, and take the PHY for Ethernet link 240 that is connected to computing device 210 out of the energy saving state, allowing Ethernet link 240 to be restored. Once Ethernet link 240 is back up in a fully operational state, intermediary device 220 would then forward the WoL packet to the sleeping computing device 210, thereby enabling activation (or wake-up) of computing device 210.

It should be noted that intermediary device 220 can also be configured to respond to address resolution protocol (ARP) requests received from network 230 destined for the sleeping computing device 210. Intermediary device 220 would respond to these ARP requests on behalf of sleeping computing device 210. If intermediary device 220 did not respond on behalf of sleeping computing device 210, then other network devices would not know what Ethernet MAC address to use to send packets to the sleeping computer device 210, which could prevent them from being able to send a WoL packet to the sleeping computing device 210.

In one embodiment, the PHY in intermediary device 220 that supports Ethernet link 240 can be partially, but not fully, powered-down, and in a state where just link energy is on the wire such that a cable unplug event could be identified. In another embodiment, PHY in switch 220 can save power by implementing subrating on the link (e.g., low power idle (LPI) mode or subset PHY mode) to enable energy efficient Ethernet (EEE).

Figure 4:
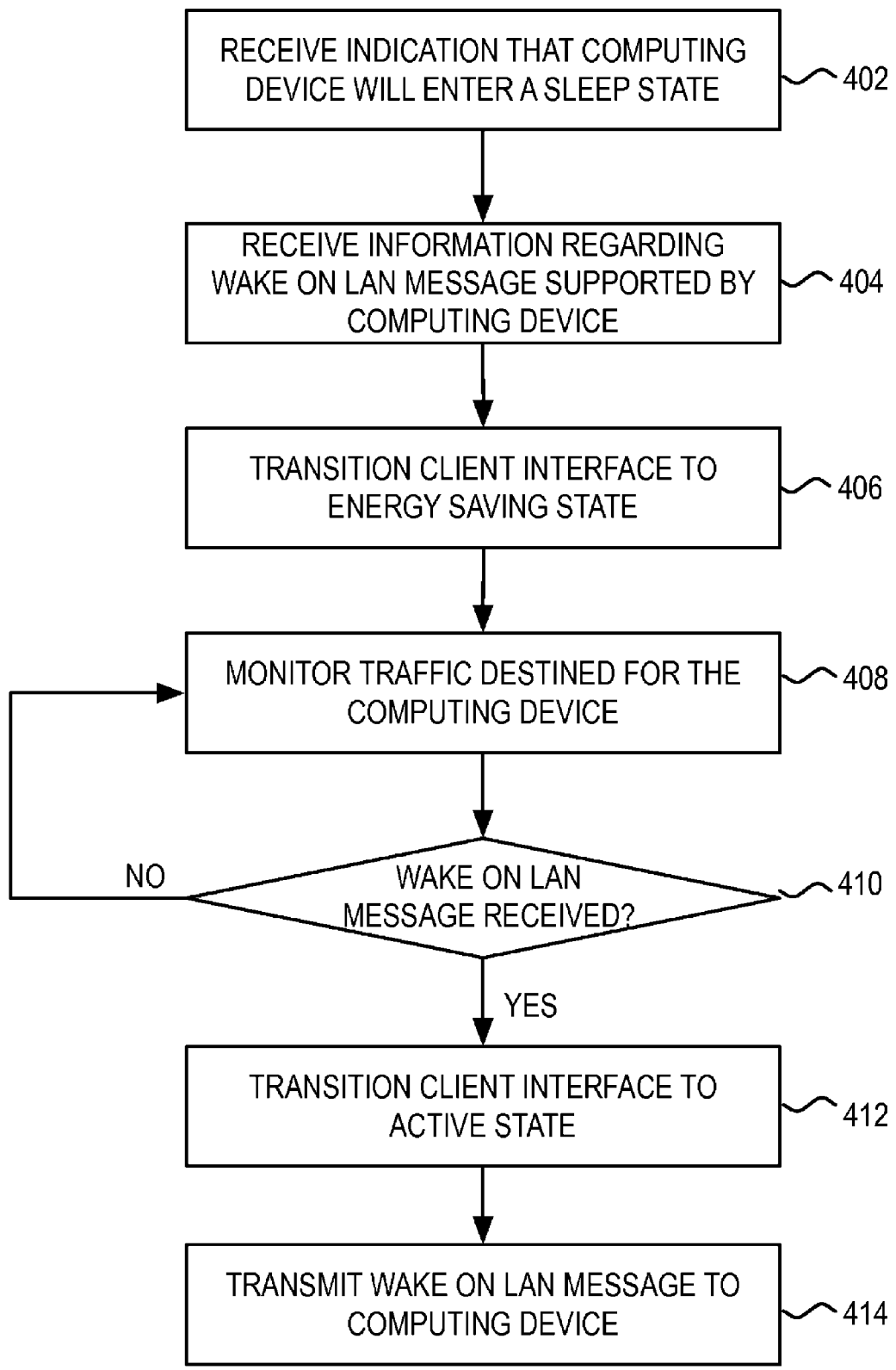
FIG. 4 illustrates a flowchart of a process of the present invention.

To further illustrate the principles of the present invention, reference is now made to the flowchart of FIG. 4. As illustrated, the process begins at step 402 where intermediary device 220 receives an indication from computing device 210 that computing device 210 is in the process of entering a WoL enabled sleep (or low power) state. This received indication can be in response to the autonomous action that is taken by computing device 210 in entering the sleep state. In one scenario, the entering by computing device 210 into a sleep state can be based on the remote action taken by a network management station. In this scenario, the indication that computing device 210 has entered into a sleep state can be received by intermediary device 220 from either computing device 210 or from network 230. In general, the source of the sleep-state indication would be implementation dependent and would not detract from the principles of the present invention.

At step 404, intermediary device 220 would then receive information regarding the type of WoL message that is supported by computing device 210. In one embodiment, the WoL message information is received together with the received indication of step 402. In another embodiment, the WoL message information is received in a separate communication that can occur before or after the received indication of step 402. Of course, if the WoL message information represents a standardized message, then the WoL message information receiving of step 404 can be an optional step.

It should also be noted that the source of the WoL message information can be computing device 210 as well as network 230. In general, the source and timing of receipt of the information passed in steps 402 and 404 would depend on the implementation of computing device 210 as well as the management of computing device 210.

Regardless of the source and timing of the information received by intermediary device in steps 402 and 404, the entry of computing device 210 into a sleep state provides intermediary device 220 with an opportunity to gain additional energy savings. At step 406, the EEE control at intermediary device 220 can then proceed to transition the client interface that supports computing device 210 into an energy saving state. As would be appreciated, the specific type of energy saving state would be implementation dependent. In one embodiment, the energy saving state represents a low power state of the PHY (e.g., low power idle or subset PHY). In another embodiment, the energy saving state represents a low power state of the PHY and higher layer logic elements (e.g., MAC).

After the client interface of intermediary device 220 has entered into an energy saving state, intermediary device 220 can then monitor, at step 408, the traffic destined for computing device 210 to determine whether a WoL message has been received. This monitoring can be designed to identify a WoL message that intermediary device 220 was previously made aware of with regard to computing device 210.

In this operating state, intermediary device 220 is able to produce additional energy savings through the effective emulation of WoL on behalf of computing device 210. In other words, intermediary device 220 is operating as a proxy for computing device 210 in determining whether a magic packet designed to wake up computing device 210 is received from network 230.

At step 410, intermediary device 220 continues to monitor traffic destined for computing device 210 to determine whether a WoL message is received. This process will continue indefinitely until such a WoL message is determined to have been received. Intermediary device 220 will discard any non-WoL packets received from network 230 that would otherwise have been forwarded to computing device 210 (except for ARPs, which intermediary device 220 would provide a proxy response for). Throughout this monitoring period of time, intermediary device 220 can continue to save power on the client interface that supports computing device 210.

When it is determined at step 410 that a WoL message has been received for computing device 210, the process then continues to step 412 where the EEE control at intermediary device 220 transitions the client interface that supports computing device 210 from the energy saving state to an active state. In one embodiment, the WoL message is buffered until the client interface has completed its transition to an active state. After the transition of the client interface back to the active state is completed, intermediary device 220 can transmit the WoL message to computing device 210 at step 414. Upon its receipt, computing device 210 would then awaken to receive additional communication from network 230.

In one embodiment, computing device 210 can also communicate information to intermediary device regarding an amount of time needed to awaken from the sleep state. As would be appreciated, this amount of time can depend on the particular sleep state that is used by computing device 210. Receipt of this information by intermediary device 220 can enable intermediary device 220 to determine an amount of time needed to transition the client interface back to the active state. This could dictate the amount of buffering that is allocated to the client interface or the type of energy saving state that is used at the client interface.

It should be noted that the principles of the present invention can be applied to various EEE control policies, regardless of the particular implementation in the stack. Further, it should be noted that the principles of the present invention are not dependent on the particular communication protocol across the link. Any communication protocol that can advertise parameters associated with WoL states can be used.

As would be appreciated, the principles of the present invention can be used with various port types (e.g., backplane, twisted pair, optical, etc.) as well as standard or non-standard (e.g., 2.5 G, 5 G, 10 G, etc.) link rates, as well as future link rates (e.g., 40 G, 100 G, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
receiving, in a first interface of an intermediary device, information from a network interface device in a computing device, said received information providing an indication to said intermediary device that said computing device has entered a sleep state, said received information also informing said intermediary device of a message that can awaken said computing device from said sleep state;
transitioning, in response to said receiving, said first interface from an active state to an energy saving state;
while said first interface is in said energy saving state, determining whether communication received from a network via a second interface of said intermediary device that is destined for said computing device includes said message;
transitioning said first interface from said energy saving state to said active state when it is determined that said communication from said network that is destined for said computing device includes said message; and
buffering said message in said intermediary device until said first interface has returned to said active state.

2. The method of claim 1, wherein said receiving comprises receiving information regarding a type of wake on LAN packet.

3. The method of claim 1, wherein said receiving comprises receiving in a single communication.

4. The method of claim 1, wherein said transitioning comprises transitioning a physical layer device from an active state to a power saving state.

5. The method of claim 4, wherein said transitioning comprises entering a low power idle mode.

6. The method of claim 4, wherein said transitioning comprises entering a subset physical layer device mode.

7. The method of claim 1, wherein said intermediary device is a voice over IP phone.

8. The method of claim 1, further comprising discarding by said intermediary device said communication if it is determined that said communication does not include said message.

9. The method of claim 1, further comprising responding by said intermediary device to an address resolution protocol request on behalf of said computing device.

10. A method, comprising:
receiving, in a first interface of an intermediary device, an indication from a network interface device in a computing device that said computing device has entered a sleep state;
transitioning, in response to said received indication, said first interface that supports said computing device from an active state to an energy saving state;
transitioning said first interface from said energy saving state to said active state after it is determined that a communication to awaken said computing device is received from a network via a second interface of said intermediary device; and
buffering said communication in said intermediary device until said first interface has returned to said active state.

11. The method of claim 10, further comprising receiving by said intermediary device information regarding a wake on LAN packet.

12. The method of claim 10, wherein said transitioning comprises transitioning a physical layer device.

13. The method of claim 10, wherein said intermediary device is a voice over IP phone.

14. The method of claim 10, wherein said communication is a wake on LAN packet.

15. The method of claim 10, further comprising transmitting by said intermediary device said communication to said computing device via said first interface after said first interface has transitioned to said active state.

16. The method of claim 10, further comprising receiving by said intermediary device information regarding an amount of time needed by said computing device to awaken.

17. An Ethernet device, comprising
a first external port that communicates with a network;
a second external port that communicates with a computing device, said second external port including a physical layer device; and
a controller that transitions said physical layer device from an active state to an energy saving state when said computing device enters a sleep state and transitions said physical layer device from said energy saving state to said active state when a message to awaken said computing device is received from said network, said controller buffering said message to awaken said computing device until said physical layer device has returned to said active state from said energy saving state.

18. The device of claim 17, wherein said Ethernet device is a voice over IP phone.

19. The device of claim 17, wherein said energy saving state is a low power idle state.

20. The device of claim 17, wherein said energy saving state is a subset physical layer device state.

21. The device of claim 17, wherein said message is a wake on LAN message.

22. The device of claim 17, wherein said physical layer device in said second external port is coupled to a network interface device in said computing device via a twisted pair network cable.

* * * * *